Figure 1:
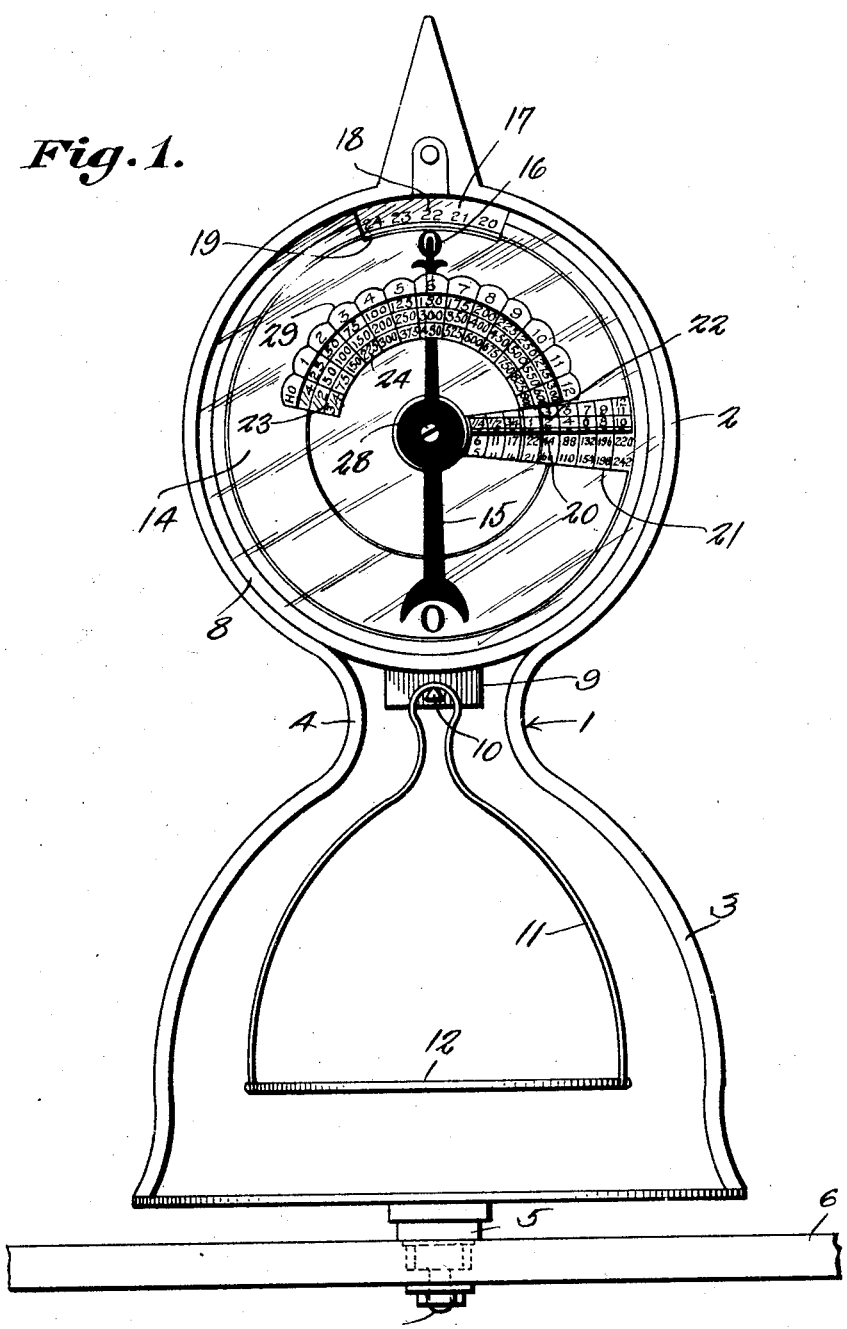

Nov. 26, 1929.  C. F. CHRISTOPHER  1,736,821

REVOLVING COMPUTING SCALE

Filed Sept. 28, 1928   2 Sheets-Sheet 1

Calvin F. Christopher, Inventor

By C. A. Snow & Co.

Attorneys

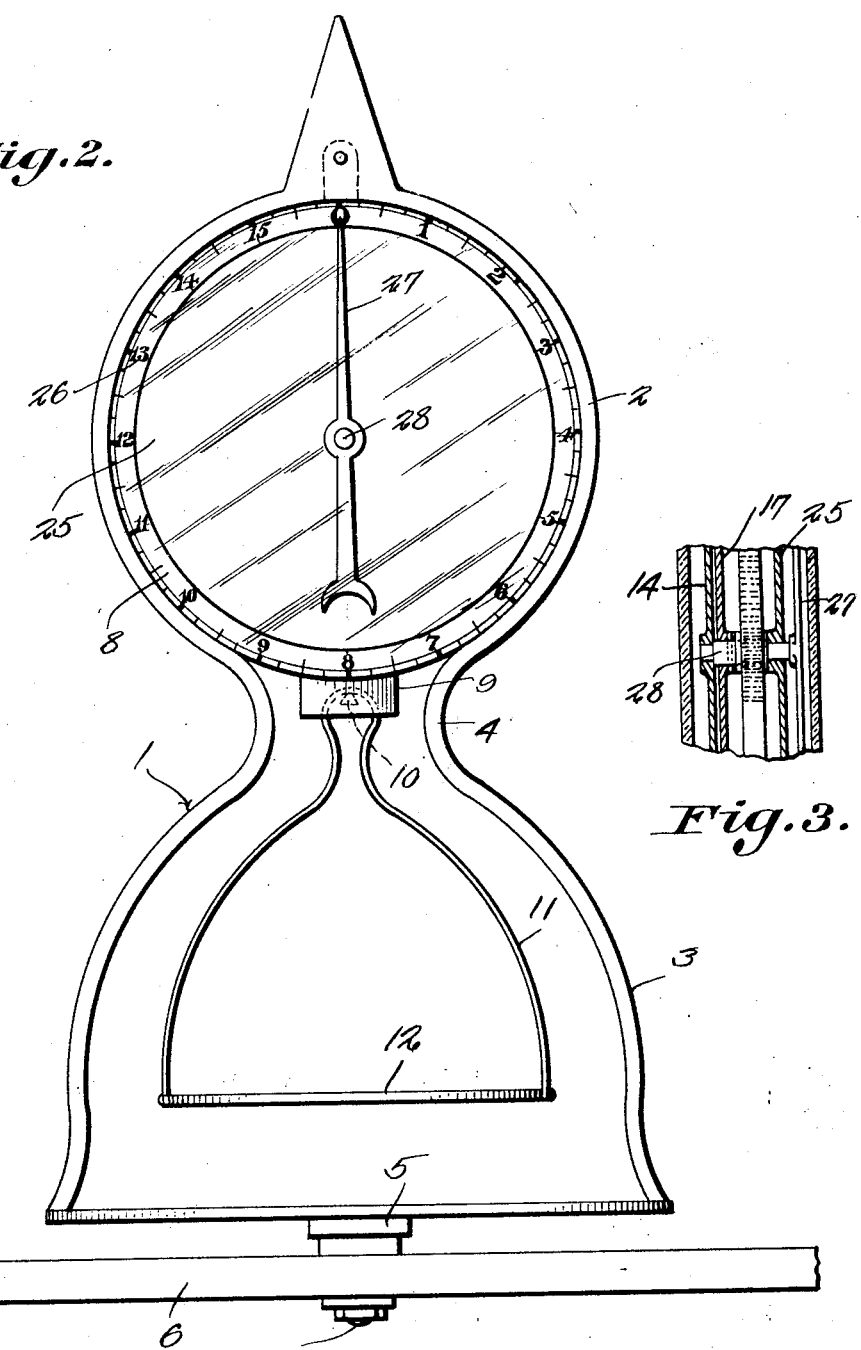

Patented Nov. 26, 1929

1,736,821

UNITED STATES PATENT OFFICE

CALVIN F. CHRISTOPHER, OF CANTON, NORTH CAROLINA

REVOLVING COMPUTING SCALE

Application filed September 28, 1928. Serial No. 309,080.

This invention aims to provide a novel scale so constructed that it can be reversed on a vertical axis, thereby to enable the purchaser to see all of the computations, and the like, with the same ease and certainty that the merchant can see them. Another object of the invention is to provide a combined weighing scale and computing scale. A further object of the invention is to provide novel means for mounting the spring balance and its pan.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 is an elevation showing one side of the device, and Figure 2 is an elevation showing the opposite side of the device.

Figure 3 a sectional view showing the shaft and attendant parts.

The structure forming the subject matter of this application includes a frame preferably made of metal and denoted as a whole by the numeral 1. The frame 1 includes a loop shaped top 2 of circular outline and a base 3 which widens as it extends downwardly, the top 2 and the base 3 being open and being connected by a reduced neck 4. On its lower end, the base 3 has a spacing boss 5 which holds the base apart from a counter 6, or other support, whereon the structure is mounted. The spacing boss 5 has a pivot element 7, such as a stud, carrying a nut, and mounted in the support 6. By this means, the frame 1 is mounted to turn about a vertical axis represented by the axis of the part 7.

The numeral 8 designates a spring balance which is mounted securely in the top 2 of the frame 1.

The spring balance 8 has a depending hanger 9, provided with a knife edge 10 whereon is mounted the bail 11 of a pan 12, the pan 12 being located within the base 3, and the hanger 9 and the upper part of the bail 11 being located in the neck 4, the pan 12, thus, being pivotally mounted.

The spring balance 8 includes a fixed dial 14. A pointer 15 is printed on the dial 14 and points to the zero point 16 of the fixed dial 14. The spring balance includes a rotatable disc 17 connected to the shaft 28 of the spring balance. On the rotatable disc 17 near to its margin, are marks 18, which, in the present discussion, may be taken to indicate pounds. The marks 18 are visible through an opening 19 in the upper part of the fixed dial 14. The rotatable disc 17 is provided with marks 20 that are visible through a slot 21 in the fixed dial 14, and on the fixed dial 14, at a point closely adjacent to the slot 21, there are marks 22. The fixed dial 14 may be provided with marks 23, 24, and 29, used for simple computations, independently of the spring balance. Thus, for instance, noting the points at which the numerals 23, 24, and 29 are applied in Figure 1 of the drawings, it can be ascertained at a glance that three pounds of a substance that costs three quarters of a dollar a pound, will call for a payment of $2.25.

Figure 1 shows one side of the device, and Figure 2 shows the opposite side. In Figure 2, the spring balance is shown as comprising a fixed disc 25, having marks 26 with which cooperates a hand 27 on the shaft 28 of the spring balance. This part of the structure may be used for any desired purpose, for instance, for weighing. If an article is placed on the pan 12, the hanger 9 is carried downwardly, the shaft 28 is rotated, and the hand 27, cooperating with the marks 26 will show the weight of the article. At the same time, referring to Figure 1, the rotatable disc 17 is turned. Noting the position of the mark indicated at 18, it will be seen that 22 pounds of a substance have been weighed. Referring to the mark at 22, which indicates the price, and to the mark at 20, it will be seen that 22 pounds of a substance that costs 2¢ a pound calls for a payment of 44¢.

The entire device may be reversed on its pivot mounting 7 and therefore, either side of the machine may be faced either to the shopkeeper or to the customer, and in this way there can be no controversy or doubt as to what the machine actually is indicating.

Having thus described the invention, what is claimed is:—

In a device of the class described, a frame comprising a top and a base, the top and the base being opposite and being connected by a reduced neck, means on the base for mounting the frame for turning movement on vertical axis, a spring balance mounted in the top portion of the frame, a pan located in the base portion of the frame, and a connection uniting the balance and the pan, the connection being located in the neck.

In testimony that I claim the foregoing as my own, I have hereto affixed my signature.

CALVIN F. CHRISTOPHER.